(12) United States Patent
Janson

(10) Patent No.: US 6,682,020 B2
(45) Date of Patent: Jan. 27, 2004

(54) UNFOLDING JOINT FOR SATELLITE SOLAR GENERATORS

(75) Inventor: Jürgen Janson, Ottobrunn (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 10/266,579

(22) Filed: Oct. 9, 2002

(65) Prior Publication Data

US 2003/0031505 A1 Feb. 13, 2003

Related U.S. Application Data

(62) Division of application No. 09/597,711, filed on Jun. 19, 2000.

(30) Foreign Application Priority Data

Jun. 17, 1999 (DE) .......................................... 199 27 596
May 16, 2000 (DE) .......................................... 100 23 852

(51) Int. Cl.[7] .............................................. B64G 1/44
(52) U.S. Cl. ...................................................... 244/173
(58) Field of Search .............................. 244/131, 173, 244/1 R; 403/71, 102

(56) References Cited

U.S. PATENT DOCUMENTS

| | | | | |
|---|---|---|---|---|
| 3,525,483 A | * | 8/1970 | Van Alstyne ................ 244/173 |
| 4,014,617 A | * | 3/1977 | Meston ........................ 403/111 |
| 4,068,770 A | * | 1/1978 | Boehringer .................. 414/537 |
| 4,116,258 A | * | 9/1978 | Slysh et al. .................. 160/213 |
| 4,373,690 A | | 2/1983 | Stillman et al. |
| 4,393,541 A | * | 7/1983 | Hujsak et al. ................. 16/297 |
| 4,703,907 A | * | 11/1987 | Henry et al. ................. 244/173 |
| 4,880,188 A | * | 11/1989 | Roth et al. .................. 244/173 |
| 5,110,301 A | * | 5/1992 | Inoue et al. ................. 439/310 |
| 5,509,747 A | * | 4/1996 | Kiendl ........................ 403/102 |
| 5,682,795 A | * | 11/1997 | Solomon et al. ........... 74/490.04 |
| 5,778,730 A | * | 7/1998 | Solomon et al. ........... 74/490.04 |
| 5,785,280 A | * | 7/1998 | Baghdasarian .............. 244/173 |
| 5,833,176 A | * | 11/1998 | Rubin et al. ................. 244/173 |
| 6,008,447 A | * | 12/1999 | Meurer et al. ............... 136/245 |
| 6,010,096 A | * | 1/2000 | Baghdasarian .............. 244/173 |
| 6,199,617 B1 | * | 3/2001 | Schweiss ..................... 160/193 |
| 6,488,435 B1 | * | 12/2002 | Janson ......................... 403/71 |
| 2003/0031505 A1 | * | 2/2003 | Janson ......................... 403/73 |

FOREIGN PATENT DOCUMENTS

| | | |
|---|---|---|
| DE | 3215431 C2 | 10/1983 |
| FR | 1055573 A1 * | 2/1954 |
| JP | 01-282097 A * | 11/1989 |

OTHER PUBLICATIONS

Kellermeier et al., "The Retractable Ultra–Lightweight (ULP) Solar Array for Retrievable Space Platforms", Aircraft Engineering, pp. 2–5, Jan. 1984.*

* cited by examiner

Primary Examiner—Peter M. Poon
Assistant Examiner—Stephen Holzen
(74) Attorney, Agent, or Firm—Crowell & Moring LLP

(57) ABSTRACT

A joint is provided for unfolding systems, e.g. for satellite solar generators that permits sufficiently large unfolding torque, low weight and small dimensions. A drive on one joint half acts on a small pulley to wind a cord on it. The other end of the cord is tautly connected to a large pulley that rotates on the hinge pin and is fixed to the second joint half. The large pulley rotates in the opposite direction of the small pulley when the cord is wound so that the second joint half folds away from the first joint half on the hinge pin into an unfolded state and is held In this state by a stop against the tension of the cord. The joint is used, for example, for unfolding joints for satellite solar generators that consist of two joint halves, a hinge pin and a drive.

10 Claims, 2 Drawing Sheets

UNFOLDING JOINT FOR SATELLITE SOLAR GENERATORS

This application is a division of U.S. patent application Ser. No. 09/597,711, filed Jun. 19, 2000, and claims the priority of German Patent Document 199 27 596.3, filed Jun. 17, 1999, the disclosures of which applications are expressly incorporated by reference herein.

BACKGROUND AND SUMMARY OF THE INVENTION

The invention concerns a joint for unfolding systems such as satellite solar generators. Preferred embodiments include joints with two joint halves, a hinge pin and a drive.

Unfolding systems such as large-area satellite solar generators consist, for example, of individual flexible segments that unfold after being transported into space.

The unfolding can be brought about by spring or motor-actuated unfolding joints that can be directly connected to the individual segments or connected to rigid extension arms that act on the segments.

To unfold large-area segments by means of springs, unfolding joints must be used that have large springs to provide sufficient unfolding torque. Such unfolding joints weigh a great deal, are large, and are therefore not very useful or useless in extreme cases for satellite solar generators.

A problem of the invention is to create a joint for unfolding systems that has sufficient unfolding torque, does not weigh much, and has small dimensions.

The problem is solved according to the invention by providing a joint for an unfolding system, which joint includes first and second joint parts, a hinge pin pivotally connecting the first and second joint parts, a large pulley rotatably mounted at the hinge pin and fixed to the first joint part, a small pulley disposed on the second joint part at a spacing from the large pulley, a cord partially wound on both the large and small pulleys, and a drive. The drive, when in use, operates to rotate the small pulley to wind the cord thereon. The cord is operable to rotate the large pulley and unfold the first and second joint parts with respect to one another into an unfolded state with said joint parts held in the unfolded state by a stop.

The invention has the advantage that small and light springs or motors can be used to generate a large amount of torque to better exploit the available installation area of such unfolding systems.

An exemplary embodiment of the invention will be further described in the following with reference to the drawing. An example of an unfolding joint for satellite solar generators with a spring drive will be described.

Other objects, advantages and novel features of the present invention will become apparent from the following detailed description of the invention when considered in conjunction with the accompanying drawings.

DETAILED DESCRIPTION OF THE DRAWINGS

Figure 1:
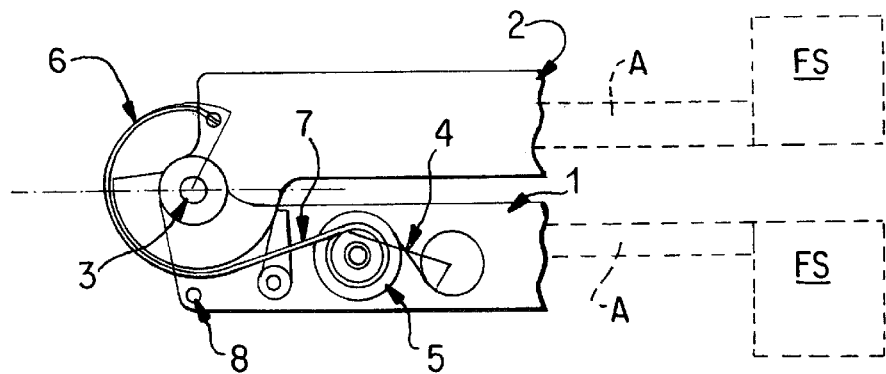
FIG. 1 is a schematic sectional view of an unfolding joint in a folded state and constructed according to a preferred embodiment of the present invention.

The unfolding joint in FIG. 1 comprises two joint halves 1, 2, a hinge pin 3, a drive spring 4, a small pulley 5, a large pulley 6 (the diameter of the small pulley 5 is less than that of the large pulley 6), a cord 7 and a stop 8.

The small pulley 5 is rotatably mounted to a joint half 1 and is connected to the drive spring 4. After the pretensioned drive spring 4 is triggered by telecontrol, it exerts torque on the small pulley. The drive spring 4 is connected to the small pulley 5 so that the torque winds the cord 7 that is attached at one end to the perimeter of the small pulley 5.

The large pulley 6 is mounted on the hinge pin 3 that connects the two joint halves 1, 2 and is fixed to the second joint half 2. The cord 7 is taut between the two pulleys, and its other end is anchored to the perimeter of the pulley 6 in such a manner that the two pulleys rotate in opposite directions.

Figure 2:
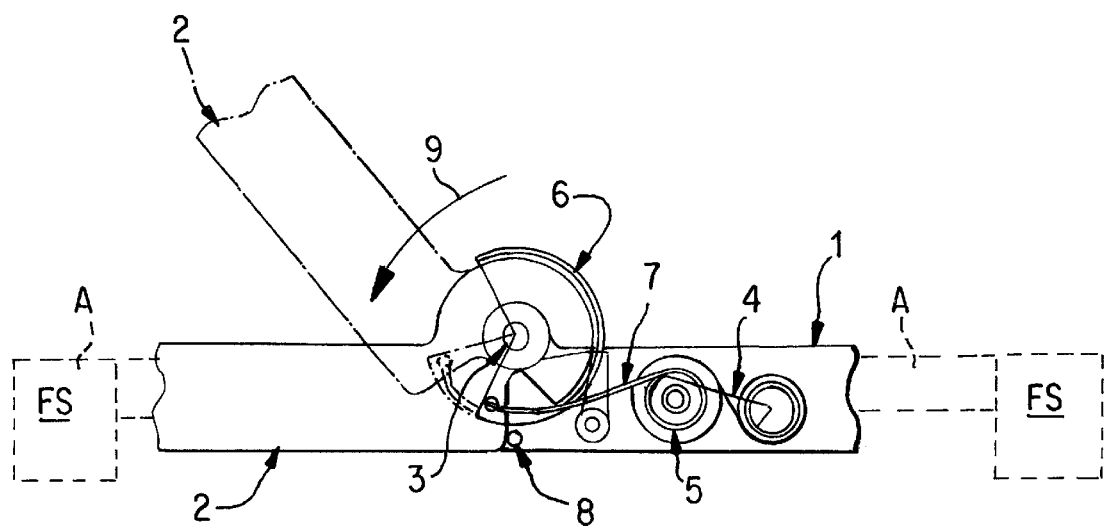
FIG. 2 shows the unfolding joint of FIG. 1 in an unfolded state.

FIG. 2 shows, that during the above-described spring-driven winding process onto the small pulley 5, the large pulley 6 is driven by the cord 7 according to the invention so that the connected second joint half 2 opens away from the first joint half 1 in the direction of the arrow 9 an dis pulled open into an unfolded state. In the exemplary embodiment shown here, the unfolded state is attained when an open angle of 180 degrees is reached. The second joint half 2 is stopped by a stop 8 in its unfolded position against the tension generated by the drive spring 4 on the cord 7. The stop 8 is fixed to the first joint half.

In the above-described unfolding joint, the two differently-sized pulleys connected by the cord serve to translate the torque generated by the drive spring 4 before its acts on the hinge pin 3. In the exemplary embodiment, the diameters of the small and large pulleys 5, 6 are adapted to each other so that they produce a transmission ratio of I=0.4, i.e., the drive spring 4 only has to exert 40% of the required torque on the hinge pin 3 so that it can be correspondingly small and light. The transmission ratio "I" can be adapted to deviate from the cited value, and the pulley diameters can be freely selected within wide limits.

Figure 2A:
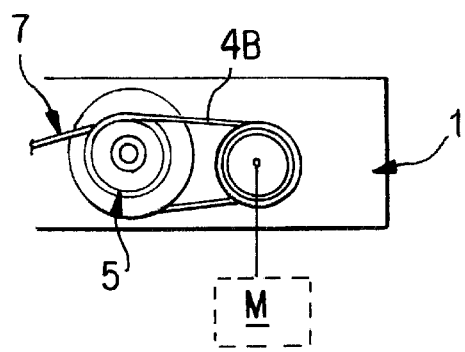
FIG. 2A is a schematic depiction of an alternative arrangement for the drive of the small pulley, including a drive toothed-belt and motor.
Figure 2B:
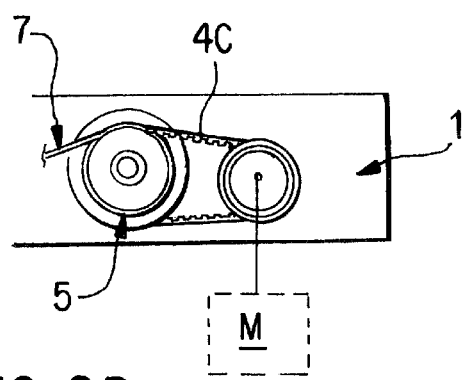
FIG. 2B is a schematic depiction of an alternative arrangement for the drive of the small pulley, including a drive chain and motor.
Figure 2C:
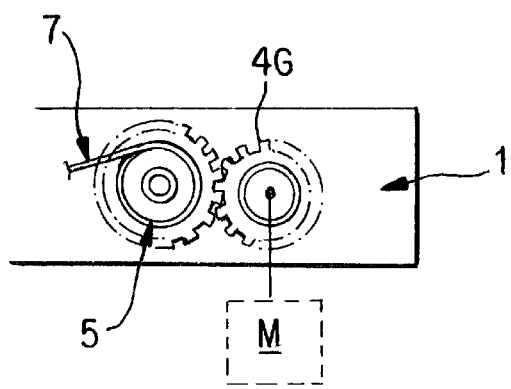
FIG. 2C is a schematic depiction of an alternative arrangement for the drive of the small pulley, including a drive gear and motor.

In contrast to the above-described cord drive, a gear drive, chain drive or toothed-belt drive can be used to generate the transmission ratio. FIG. 2A schematically depicts a belt drive 4B for rotating the small pulley 5 using a motor M. FIG. 2B schematically depicts a chain drive 4C for rotating the small pulley 5 using a motor M. FIG. 2C schematically depicts a gear drive 4G for rotating the small pulley 5 using a motor M.

The drive spring 4 is designed as a constant torque spring and generates nearly constant torque as the joint unfolds over the entire unfolding range (here the cited 180 degrees). Any kind of drive spring or drive can be used as the drive spring 4, e.g. a spiral spring or a motor.

To save weight, the small and/or large pulleys 5, 13 can have cutouts.

The joint halves 1, 2 can be rigidly connected with extension arms A that unfold the flexible segments FS of the solar generator, or be directly integrated into a segment frame.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A satellite solar generator assembly comprising:

first and second joint parts connected with respective solar generator extension arms, a hinge pin pivotally connecting the first and second joint parts, a large pulley rotatably mounted at the hinge pin and fixed to the first joint part, a small pulley disposed on the second joint part at a spacing from the larger pulley, a cord partially wound on both the large and small pulleys, and a drive which in use operates to rotate the small pulley to wind the cord thereon, said cord being operable to rotate the large pulley and unfold the solar generator extension arms, wherein a ratio of a torque on the large pulley over a torque on the small pulley is equal to a ratio of the diameter of the large pulley over the diameter of the small pulley.

2. An assembly according to claim 1, wherein the drive includes a spring member which can be triggered by telecontrol.

3. An assembly according to claim 1, wherein the ratio of the sizes of the pulleys provides that less than one half of the torque required to unfold the joint part needs to be applied by the drive to the small pulley.

4. An assembly according to claim 1, wherein the ratio of the sizes of the pulleys provides that less than one half of the torque required to unfold the joint parts needs to be applied by the drive to the small pulley.

5. An assembly according to claim 2, wherein the spring member is configured to apply a substantially constant torque over the predetermined folding range of the joint part.

6. An assembly according to claim 4, wherein the predetermined folding range is 180°.

7. An assembly according to claim 5, wherein the ratio of the sizes of the pulleys provides that less than one half of the torque required to unfold the joint halves needs to be applied by the drive to the small pulley.

8. An assembly according to claim 1, wherein the drive is a motor driven chain drive.

9. An assembly according to claim 1, wherein the drive is a motor driven toothed-belt drive.

10. An assembly according to claim 1, wherein the drive is a motor driven gear drive.

* * * * *